United States Patent
Degner et al.

(10) Patent No.: US 10,734,848 B2
(45) Date of Patent: Aug. 4, 2020

(54) FIXTURES AND METHODS FOR FORMING ALIGNED MAGNETIC CORES

(71) Applicant: FORD GLOBAL TECHNOLOGIES, LLC, Dearborn, MI (US)

(72) Inventors: Michael W. Degner, Novi, MI (US); Feng Liang, Troy, MI (US); C Bing Rong, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 192 days.

(21) Appl. No.: 15/962,268

(22) Filed: Apr. 25, 2018

(65) Prior Publication Data

US 2018/0241260 A1   Aug. 23, 2018

Related U.S. Application Data

(62) Division of application No. 14/535,807, filed on Nov. 7, 2014, now abandoned.

(51) Int. Cl.
*H01F 1/22*     (2006.01)
*H02K 1/02*     (2006.01)
(Continued)

(52) U.S. Cl.
CPC .............. *H02K 1/02* (2013.01); *H01F 1/22* (2013.01); *H01F 3/08* (2013.01); *H01F 41/0246* (2013.01);
(Continued)

(58) Field of Classification Search
CPC .. H02K 1/00; H02K 1/02; H02K 1/04; H02K 1/14; H02K 1/148; H02K 1/17;
(Continued)

(56) References Cited

U.S. PATENT DOCUMENTS

| | | |
|---|---|---|
| 5,146,198 A | 9/1992 | Pollard et al. |
| 5,350,558 A | 9/1994 | Kawato et al. |
| 5,684,352 A | 11/1997 | Mita et al. |
| 5,693,250 A | 12/1997 | El-Antably et al. |
| 5,861,695 A | 1/1999 | Brassard |
| 6,872,325 B2 | 3/2005 | Bandyopadhyay et al. |

(Continued)

FOREIGN PATENT DOCUMENTS

| | | |
|---|---|---|
| CN | 1173950 A | 2/1998 |
| DE | 10246719 A1 | 4/2004 |

(Continued)

OTHER PUBLICATIONS

First Office Action for Chinese Application No. 201510751647.2, dated Apr. 28, 2018, 9 Pages.

*Primary Examiner* — Tran N Nguyen
(74) *Attorney, Agent, or Firm* — David Kelley; Brooks Kushman P.C.

(57) ABSTRACT

Magnetic cores and method and fixtures for forming the same are disclosed. The magnetic core may comprise a magnetic body including magnetic grains and a magnetic flux path, the magnetic grains aligned in a plurality of distinct directional alignments to conform to the magnetic flux path. The grain orientation of the cores may be provided by fixtures including electrical circuits and/or permanent magnets. The fixtures may be configured to produce magnetic fields that approximate, mimic, or correspond to a magnetic flux path in the magnetic core, once it is consolidated and in use. The magnetic fields may orient the grains of the magnetic core when they are in an unconsolidated state, such that the grains are aligned in a plurality of directional alignments that approximate, mimic, or correspond to a magnetic flux path in the magnetic core.

10 Claims, 6 Drawing Sheets

(51) Int. Cl.
*H01F 3/08* (2006.01)
*H01F 41/02* (2006.01)
*H02K 1/27* (2006.01)
*H02K 15/02* (2006.01)
*H02K 1/04* (2006.01)

(52) U.S. Cl.
CPC ............ *H02K 1/276* (2013.01); *H02K 15/02* (2013.01); *H02K 1/04* (2013.01)

(58) Field of Classification Search
CPC .... H02K 1/22; H02K 1/24; H01F 1/00; H01F 1/22; H01F 3/00; H01F 3/08; H01F 3/10; H01F 3/14; H01F 13/00; H01F 13/003; H01F 29/00; H01F 29/14; H01F 41/00; H01F 41/02; H01F 41/0246; H01F 7/00; H01F 7/02; H01F 7/021; H01F 7/0221; H02M 7/48
See application file for complete search history.

(56) References Cited

U.S. PATENT DOCUMENTS

| | | |
|---|---|---|
| 7,041,148 B2 | 5/2006 | Iorio et al. |
| 2004/0119365 A1 | 6/2004 | Breznak et al. |
| 2006/0055266 A1 | 3/2006 | Iwami et al. |
| 2011/0074231 A1 | 3/2011 | Soderberg |
| 2013/0119816 A1* | 5/2013 | Yang ............... H02K 1/148 |
| | | 310/216.007 |
| 2013/0120098 A1 | 5/2013 | Chatani et al. |

FOREIGN PATENT DOCUMENTS

| | | | | |
|---|---|---|---|---|
| JP | H08331784 A | | 12/1996 | |
| JP | H10271716 A | | 10/1998 | |
| JP | 10340809 | * | 12/1998 | ............... H02K 1/00 |
| JP | 2010213508 A | | 9/2010 | |
| JP | 2013121262 | * | 6/2013 | ............... H02K 1/22 |
| JP | 2013121262 A | | 6/2013 | |
| WO | 2007141489 A2 | | 12/2007 | |

* cited by examiner

FIXTURES AND METHODS FOR FORMING ALIGNED MAGNETIC CORES

CROSS-REFERENCE TO RELATED APPLICATIONS

This application is a division of U.S. application Ser. No. 14/535,807 filed Nov. 7, 2014, the disclosure of which is hereby incorporated in its entirety by reference herein.

TECHNICAL FIELD

The present disclosure relates to aligned magnetic cores and fixtures and methods for making the same.

BACKGROUND

Electric machines convert energy through electromagnetic interactions, such as electricity to electricity (transformer), electricity to mechanical power (motor), or mechanical power to electricity (generator). A factor that influences the energy conversion is the magnetic core materials, which are generally formed from laminations of electric steels (also called silicon steel). In addition to electric machines, magnetic cores in inductors also play a role in their performance. However, core loss (also called iron loss) in the magnetic core occurs due to the AC magnetic field inside the materials, especially during high frequency operation. Core loss generally includes three components: hysteresis loss, eddy current loss and excess loss (or anomalous loss). Hysteresis loss is frequency independent, while both eddy-current and excess losses are frequency dependent.

As fuel economy is an important factor in electric vehicles (EVs), such as hybrid electric vehicles (HEVs), plug-in hybrid EVs (PHEVs), and battery EVs (BEVs), reducing core loss and increasing induction (flux density) in the magnetic cores (such as rotor and stator cores) of electric machines and power electronics (such as inductor cores) may be a goal. Conventional core forming processes generally reduce losses by sacrificing other magnetic properties or enhance magnetic properties such as flux density but sacrifice loss performance.

One common way to reduce core loss in a magnetic core is to reduce the lamination thickness of the electric steel through mechanical rolling, including hot and cold rolling. Magnetic cores with thinner laminations have significantly lower eddy-current loss, and therefore lower core loss, than thicker laminations. Another way to reduce core loss is to control the chemical composition in electric steels, e.g., Si and Al content. Since Si and Al increase resistivity in electric steels, they are generally controlled during manufacturing in order to reduce the eddy-current loss. Usually 2-3% Si is used in non-oriented electric steel and about 6% in grain-oriented electric steel. Although core loss is significantly reduced by these two approaches, it is still problematic, especially for high frequency applications. Another approach to reduce core loss is to produce magnetic powders that are sintered into a bulk core directly, with or without an insulating coating on the magnetic particles. A similar approach is to mix magnetic powders with a binder and then press them into near-shape devices. However, the use of a binder may reduce the flux density and permeability of the core.

SUMMARY

In at least one embodiment, a magnetic core is provided comprising a magnetic body including magnetic grains and a magnetic flux path, the magnetic grains aligned in a plurality of distinct directional alignments to conform to the magnetic flux path. Each alignment may be a major alignment with respect to the magnetic body. In one embodiment, the magnetic body has an inner cavity. The plurality of directional alignments may extend around a perimeter of the inner cavity.

In one embodiment, the magnetic core is an inductor core. In another embodiment, the magnetic core is a stator core including a plurality of stator teeth and a plurality of stator slots between the stator teeth. The plurality of directional alignments may include a plurality of arc-shaped alignments from one stator tooth to another stator tooth around a stator slot. In another embodiment, the magnetic core is a rotor core including a plurality of permanent magnets disposed therein. The plurality of directional alignments may include a plurality of alignments extending between the permanent magnets and an outer perimeter of the rotor core.

In at least one embodiment, a fixture for aligning grains in a magnetic core is provided. The fixture may include one or more inner magnets configured to be located in an interior of the core, the inner magnets configured to generate a magnetic field in the magnetic core and align the grains in a plurality of directional alignments.

The inner magnets may be configured to generate a magnetic field in the magnetic core that mimics a magnetic flux path of the magnetic core. Each inner magnet may have a north (N) side and a south (S) side. The fixture may include a plurality of inner magnets and a plurality of outer magnets configured to be located exterior to the core and each inner magnet may form a magnet pair with an outer magnet. Each magnet pair may either have the N sides facing each other or the S sides facing each other and adjacent magnet pairs may have opposite N and S side configurations.

In one embodiment, the magnetic core is a stator core having a plurality of stator teeth and a plurality of stator slots between the stator teeth. The inner magnets may be configured to generate a magnetic field in the stator core and align the grains in a plurality of arc-shaped alignments from one stator tooth to another stator tooth around a stator slot. The inner magnets may be configured to be located at tips of the stator teeth or in the stator slots. In another embodiment, the magnetic core is a rotor core and the inner magnets are rotor permanent magnets that remain in the rotor core after consolidation.

In at least one embodiment, a fixture for aligning grains in a magnetic core is provided. The fixture may include one or more inner wires configured to be located in an interior of the core and to carry electric current in a first direction and one or more outer wires configured to be located exterior to the core and to carry electric current in a second direction, opposite the first. The inner and outer wires may be configured to generate a magnetic field in the magnetic core.

In one embodiment, the inner and outer wires are configured to generate a magnetic field in the magnetic core and align the grains in a plurality of directional alignments that mimic a magnetic flux path of the magnetic core. The fixture may include a plurality of inner wires and a plurality of outer wires and each inner wire may form a wire pair with an outer wire.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described in the background, conventional magnetic core processing generally requires a choice between good magnetic properties and good loss performance (i.e., low loss). The present disclosure provides methods and fixtures for forming magnet cores having both good magnetic properties and low loss, or less sacrifice of one property compared to another, relative to conventional magnetic cores. In at least one embodiment, magnetic cores are formed having a grain orientation along a specified predetermined or preferred direction or path. The grain orientation may be provided by applying a specified magnetic field to the magnetic core during processing. The magnetic field may be complex and/or multidirectional (e.g., not in a single, straight line). The magnetic field direction/path (and corresponding grain alignment) may conform, approximate, or correspond to the magnetic flux direction that will occur in the core during use. The degree of grain orientation in the magnetic cores produced by this method may be high, but may be moderate or low as well, depending on factors such as the magnetic powders, magnetic field strength, pressing condition, binders and others. The degree of grain orientation may be adjusted based on the required or desired properties of the magnetic cores.

The magnet cores may be formed using any suitable process, including sintering and bonding of magnetic powder. The magnetic powder may include any magnetic material that is able to be sintered or bonded to make a powder core, such as ferrite particles. The magnetic field may be applied during the forming of the cores using any suitable method, including fixtures having electrical circuits with one or more current-carrying wires and/or arranged permanent magnets. The properties of magnetic cores formed of any suitable magnetic material may be improved, including electric steels (e.g., by heat-treatment under magnetic fields). The disclosed magnetic cores may be suitable for numerous applications where improved directional permeability and flux density are beneficial. For example, the disclosed magnetic cores may be used in inductors, transformers, generators, stators, rotors, or any other devices which prefer better properties in certain directions.

Figure 1:
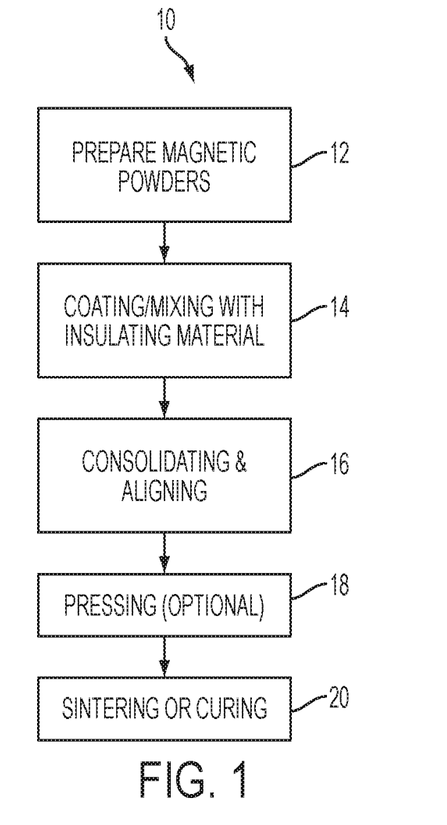
FIG. 1 is a flowchart for a method of forming a sintered magnet core, according to an embodiment.

With reference to FIG. 1, in at least one embodiment, a grain-oriented magnet core may be formed by sintering magnetic powder. The method 10 for forming the sintered core may include preparing the magnetic powder at step 12. The magnetic powder, such as ferrite, silicon-iron, or other magnetic powder, may be prepared by any suitable process. For example, the powder may be prepared by pulverization, vapor deposition, chemical synthesis, or other techniques. In at least one embodiment, the powders are prepared to have a low number of grains per particle (e.g., mean or average grains per particle). In one embodiment, the particles include up to 10 grains. In another embodiment, the particles include up to 5 grains. In another embodiment, the particles include from 1 to 3 grains. In another embodiment, the particles are single crystals (e.g., a single grain). The number of grains per particle may apply to all or substantially all of the particles in the powder or it may be an average. However, it is to be understood that processing tolerances may result in some powders having particles with varying number of grains. A low number of grains per particle allows for easier alignment of the particles during the subsequent alignment step(s). A single grain per particle may provide the easiest alignment. The particles may have any suitable size or diameter. In one embodiment, the particles have a size of 1 nm to 10 mm, or any sub-range therein. To provide increased densification of the magnet core, a powder have a range of particle sizes may be used. For example, the powder may include particles that are sub-micron, particles that are 1-10 μm, particles that are hundreds of μm, and particles that are 1-10 mm.

At step 14, the powder may be mixed with or coated with an insulating material. The high resistance of the insulating material reduces eddy current losses in the magnet core. In one embodiment, the magnetic powder may be mixed with an insulating material, which may be any suitable dielectric or high-resistance material. Non-limiting examples of insulating materials may include silica, ferrite, phosphate binders, Teflon (PTFE) binders, and others. Alternatively, the magnetic powder may be coated with an insulating material such that each particle has a core/shell configuration with the magnetic material as the core and the insulating material as the shell. The magnetic powder may be coated using any suitable method, such as chemical solution, vapor deposition, sputter coating, or others. The magnetic powder may also be oxidized through a controlled oxidation process in order to form an insulating layer on the particles. The above insulating methods may be used individually, or any combination thereof may be used to increase the resistance of the magnet core.

At step 16, the magnetic powder may be consolidated and aligned. Conventional pressing may lead to non-uniform density in the green compact, which in turn may lead to significant shape changes after sintering. In one embodiment, a tapping or agitation process may be applied during consolidation to provide more uniform compacts and reduce or eliminate shape changes after sintering. The tapping process may include air-tapping, mechanical tapping, ultrasonic tapping, or other methods of tapping or agitating the powder. In addition, any combination of the tapping processes may be performed, either sequentially or simultaneously. Air tapping may include applying air pressure to the powder and/or mold by controlling pressure, air flow load, speed and time. Mechanical tapping may include tapping the powder and/or mold using physical contact using either manual or automatic methods. Ultrasonic tapping may include tapping/vibrating the powder and/or mold using ultrasonic waves by controlling ultrasonic power, frequency and time.

The alignment process includes applying a magnetic field to the powder while it is in the mold (e.g., unconsolidated), such that the grains of the powder are aligned along the magnetic field (e.g., along their easy axes). The magnetic field may be applied in the shape or the path of the flux direction in the magnet core, thereby increasing the permeability and flux density in the flux direction of the finished core. Additional description of the fixtures and methods of producing the magnetic field is included later in the disclosure. The magnetic field may be applied while a tapping process is being performed. The tapping/agitation produced during the tapping process may allow the magnetic powder to rotate and orient themselves easier such that their easy axes are aligned with the magnetic field. In addition, if the particles have a single or only several grains per particle, as described above, the alignment in the magnetic field is further facilitated. To further facilitate and promote the rotation of the magnetic particles during the alignment process, a lubricant may be added to the powder during this step. Non-limiting examples of suitable lubricants may include surfactants, calcium stearate, polyethylene glycols, sorbitol, glycerol monostearate, or others, as well as mixtures thereof.

At step 18, an optional pressing process may be performed. Any suitable pressing method may be performed to increase the density of the magnet core, such as uniaxial pressing. A magnetic field may be applied during the pressing step 18 in order to maintain or further align the particles in the mold. The magnetic field may be the same one applied in step 16. As a result of the tapping process in step 16, the resulting green compact from the pressing may be substantially uniform in density.

At step 20, the magnetic powder may be sintered to consolidate the powder and form a finished magnet core. The sintering temperature may be any suitable temperature to consolidate the powder, for example, from 600° C. to 1,500° C. The sintering time may be any suitable time to consolidate the powder, for example, from 10 minutes to tens of hours. In general, higher temperatures will require shorter sintering times, and vice versa. A magnetic field may be applied during the sintering step 20 in order to maintain or further align the particles in the mold. The magnetic field may be the same one applied in steps 16 and/or 18. As a result of the tapping process in step 16, the resulting green compact from the pressing may be substantially uniform in density. After sintering, a finished magnet core is formed having aligned grains with increased permeability and flux density along the path of the aligned grains, which were formed using a predetermined, customized magnetic field applied during the consolidating step 16 and optionally the pressing step 18 and/or sintering step 20.

Figure 2:
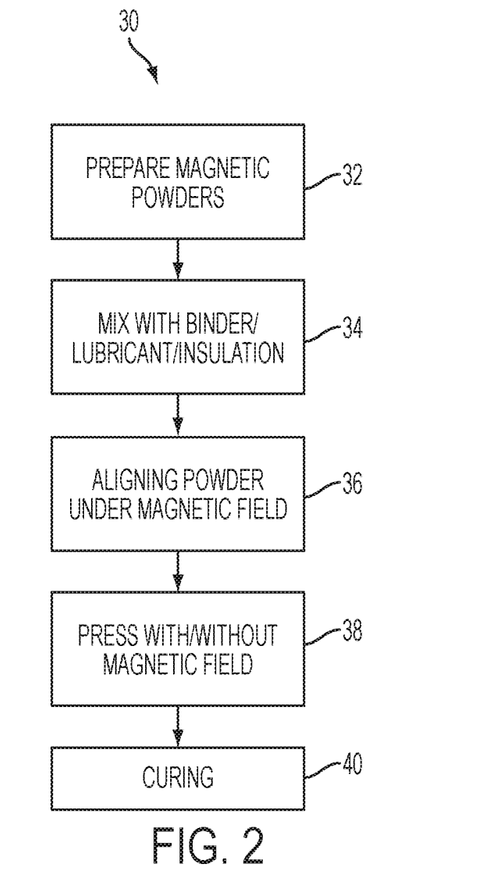
FIG. 2 is a flowchart for a method of forming a bonded magnet core, according to an embodiment.

With reference to FIG. 2, in at least one embodiment, a grain-oriented magnet core may be formed by bonding magnetic powder. The method 30 for forming the bonded core may include preparing the magnetic powder at step 32. The magnetic powder may be prepared in a similar manner as described above with respect to step 12. At step 34, the magnetic powder max be mixed with a lubricant and/or an insulating material. The insulating material and the lubricant may be similar to those described above with respect to step 14. Accordingly, steps 32 and 34 will not be described again in detail.

To prepare a bonded core, rather than a sintered core, a binder may be used to consolidate and secure the magnetic powder (and any insulating or lubricating material that is present). Any suitable binder may be used, such as thermosets, thermoplastics, elastomers, inorganic ceramic binders, high-temperature ceramic binders, or others. A non-limiting example of a thermoset that may be used as a binder is an epoxy, which may be phenolic or novalac. A non-limiting example of a thermoplastic that may be used as a binder is a polyamide, such as polyphenylene sulfide (PPS). Non-liming examples of elastomers that may be used as a binder include nitrile rubber, polyethylene, and vinyl.

At step 36, the magnetic powder may be aligned using a magnetic field. The mixture of magnetic powder and binder (plus any lubricant or insulating material) may be introduced into a mold while the binder is in a liquid or uncured state (e.g., unconsolidated). While the binder is in the liquid or uncured state, a magnetic field may be applied to the mixture and/or mold in order to align the magnetic particles in a preferred pattern or direction. Since the binder is not yet cured, the particles are more easily aligned by the magnetic field since they are free to rotate, which may allow the magnetic powder to orient themselves easier such that their easy axes are aligned/parallel with the magnetic field. As described above, the rotation may be further facilitated by using particles that have one or few grains. The magnetic field may be applied in the shape or the path of the flux direction in the magnet core, thereby increasing the permeability and flux density in the flux direction of the finished core. Additional description of the fixtures and methods of producing the magnetic field is included later in the disclosure. While not required, a tapping process, similar to described in step 16 may be applied to the binder and powder mixture during the alignment process.

At step 38, an optional pressing process may be performed. Any suitable pressing method may be performed to increase the density of the magnet core, such as compression (e.g., uniaxial pressing), extrusion, or injection molding. In one embodiment, when compression is performed, the binder used may be a thermoset. In another embodiment, when extrusion is performed, the binder may be an elastomer or a thermoplastic. In another embodiment, when injection molding is performed, the binder may be a thermoplastic. A magnetic field may be applied during the pressing step 38 in order to maintain or further align the particles in the mold. The magnetic field may be the same one applied in step 36.

At step 40, the magnetic powder and binder mixture may be cured. The curing time and temperature may vary, depending on the type of binder used. Some binders may not require the application of heat and may cure at room or ambient temperature. A magnetic field may be applied during the curing step 40 in order to maintain or further align the particles in the mold. The magnetic field may be the same one applied in steps 36 and/or 38. After curing, a finished magnet core is formed having aligned grains with increased permeability and flux density along the path of the aligned grains, which were formed using a predetermined, customized magnetic field applied during the aligning step 36 and optionally the pressing step 38 and/or curing step 40.

The magnetic field applied in either the sintered or bonded magnet cores described above may provide a magnet core suitable for any application in which anisotropic or directional magnetic properties are desired, such as permeability, induction/flux density, coercivity, core loss, or others. Non-limiting applications that may benefit from the disclosed magnet cores include inductors, transformers, generators, and rotors and/or stators of electric motors (e.g., electric vehicle motors). To provide the anisotropic/directional properties described above, a predetermined, specific magnetic field may be applied while the core is being formed that corresponds to the flux path in the finished core when it is used in a certain application. Accordingly, the magnetic field being applied may be tailored to a specific magnet core application, such as a stator or an inductor core. By generating a magnetic field having a shape or path(s) that conforms, follows, mimics, or approximates the flux path(s) in the final application, permeability, flux density, and other properties may be significantly improved without sacrificing loss performance. For magnet cores having complex shapes or that experience complex flux paths, the magnetic field may also be complex, for example, including a plurality of distinct curved or non-linear directional alignments.

The magnetic field may be applied using any suitable method. In at least one embodiment, an alignment fixture may include one or more electric circuits, each including one or more wires carrying electric current to generate the magnetic field. By controlling the placement or configuration of the wire(s) and the level and/or direction of the current, a specific, custom magnetic field can be generated that mimics or corresponds to the flux direction in a magnet core during operation. The magnetic field may therefore align the magnetic grains in a plurality of directional alignments to conform to, mimic, or follow the magnetic flux direction. As used herein, directional alignments may refer to major alignments, or those that exist on a macro scale versus micro scale. Accordingly, small deviations in alignment from one grain to another or between several grains are not considered major alignments.

In at least another embodiment, an alignment fixture may include one or more magnets for providing the magnetic field during the alignment process. In one embodiment, the magnets are permanent magnets. By controlling the placement, configuration, size, shape, and/or strength of the magnet(s), a specific, custom magnetic field can be generated that mimics or corresponds to the flux direction in a magnet core during operation. While the Figures and the following descriptions describe fixtures in which electric circuits or magnets are used to generate the magnetic field, one of ordinary skill in the art will appreciate that any combination of the two approaches may also be utilized. In addition, any magnet field line or direction shown or described may also be a directional alignment of magnetic grains.

Figure 3:
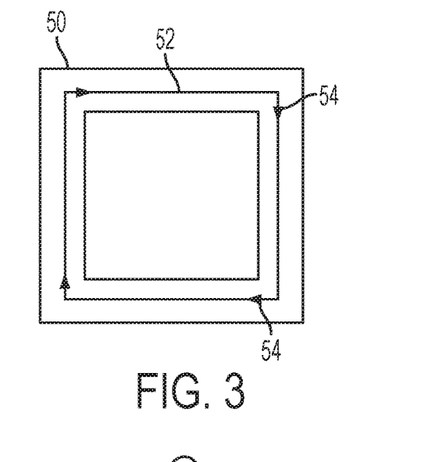
FIG. 3 is a schematic of a rectangular inductor core having a flux direction along its perimeter.
Figure 4:
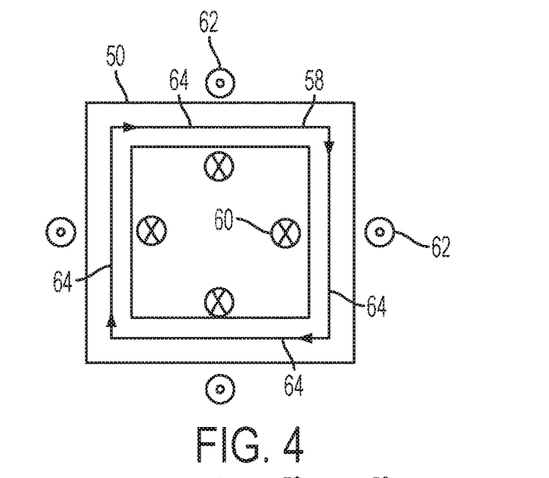
FIG. 4 is a schematic of a fixture for applying a magnetic field to a rectangular inductor core using one or more electric circuits, according to an embodiment.

With reference to FIGS. 3-15, several examples of fixtures are disclosed for generating magnetic fields for aligning magnetic grains in unconsolidated inductor, stator, and rotor cores. These figures and their corresponding descriptions are exemplary and, as discussed above, the disclosed methods and fixtures may be applied to form any desired magnetic field for any flux path. With reference to FIGS. 3-4, an inductor core 50 is shown having a hollow rectangular cross-section with an inner cavity. The magnetic flux 52 in the inductor core during operation is along the perimeter of the core 50, as shown by the arrows 54. While the arrows 54 are shown in the clockwise direction, the flux 52 may also be in the counter-clockwise direction. In order to improve the permeability and flux density in the core 50, the grains/powder of the core may be aligned in the direction of the flux. The alignment may be provided by applying a magnetic field to the grains/powder during an alignment process and optionally during a pressing and/or sintering or curing process, as described above. To produce a magnetic field in the shape or direction of the flux path 52, one or more electric circuits may be configured to generate the magnetic field. The electric circuit(s) (not shown) may include one or more current-carrying wires 56 that are arranged within or around the inductor core 50 and configured to generate a magnetic field 58 in the direction or shape of the flux path 52.

Figure 5:
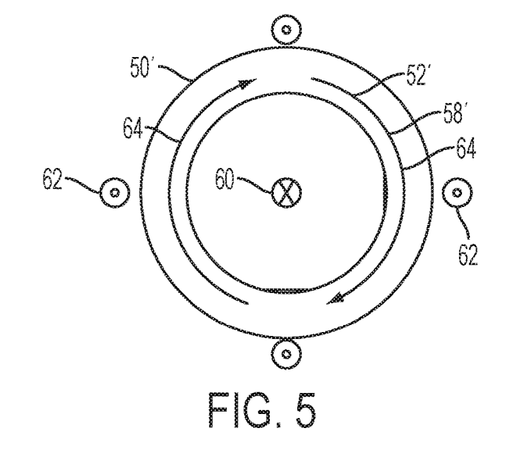
FIG. 5 is a schematic of a fixture for applying a magnetic field to a cylindrical inductor core using one or more electric circuits, according to an embodiment.

In one embodiment, shown in FIG. 4, a magnetic field 58 in the shape of the flux path 52 may be generated by placing one or more wires 60 inside of the inductor core 50 carrying current in one direction and one or more wires 62 outside of the inductor core 50 carrying current in the opposite direction. FIG. 4 shows four wires 60 inside of the inductor core 50, however, a single wire 60 may be placed inside the core 50 (e.g., in the center) to provide a similar magnetic field 58 (similar to FIG. 5, described below). While FIGS. 3 and 4 show a fixture for an inductor core 50 having a hollow rectangular shape, the inductor core may have any suitable shape, including a ring, toroid, bar, or others. For example, FIG. 5 shows an inductor core 50' having a ring shape. Similar to the rectangular core 50 in FIGS. 3 and 4, the inductor core 50' has a flux path 52' that extends around the perimeter of the core 50'. The flux path 52' may be in the clockwise or counter-clockwise direction. To generate a magnetic field 58' in the shape or direction of the flux path 52', one or more wires 60 may be arranged within the core 50' carrying current in one direction and one or more wires 62 may be arranged outside of the inductor core 50' carrying current in the opposite direction. Similar to FIG. 4, multiple wires 60 may be located inside the core 50', rather than single wire 60, as shown. The magnetic field 58/58' may cause the unconsolidated grains to orient themselves in a plurality of directional alignments 64 that conform to, mimic, or follow the magnetic field 58/58'. As shown, at least two or more of the alignments 64 may be distinct from one another. Regardless of the inductor core shape, an electric circuit may be designed to produce a magnetic field that corresponds to or mimics the flux path of the inductor. Similarly, the inductor core 50 may be replaced by a transformer core or other magnet core having a flux path that would benefit from oriented grains/powder.

Figure 6:
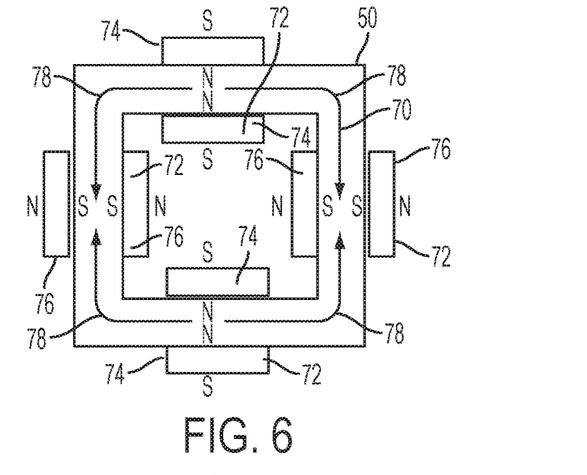
FIG. 6 is a schematic of a fixture for applying a magnetic field to a rectangular inductor core using a plurality of permanent magnets, according to an embodiment.
Figure 7:
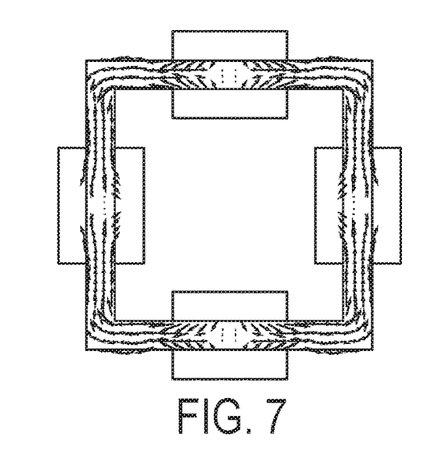
FIG. 7 is a finite element analysis simulation of the magnetic field of FIG. 6.

With reference to FIGS. 6-10, additional fixtures are shown for generating a specific, customized magnetic field 70 for an inductor core 50 that has a shape or direction that mimics or corresponds to the flux 52. The magnetic field 70 may be generated using a fixture including plurality of magnets 72 (e.g., permanent magnets) arranged in a predetermined configuration or pattern. Each magnet 72 may have a north (N) and south (S) configuration, and the pattern of the magnets 72 may generate a magnetic field 70 that mimics, corresponds, or approximates the flux path 52 and, correspondingly, orients the grains along the same. In the embodiment shown in FIG. 6, four magnets 72 are arranged inside the inductor core 50 and four magnets are arrange outside the core 50. One magnet is arranged on the inside and the outside of each of the four sides of the core 50. The magnets 72 may be arranged such that on the inside and the outside, the magnets alternate between having the N and S sides/portions of the magnet face the inductor core 50. In FIG. 6, magnets with the N side/portion facing towards the inductor core 50 are labeled 74 and magnets with the S side/portion facing towards the inductor core 50 are labeled 76. The magnets 72 may be arranged such that magnets 74 having the N side facing the inductor are placed opposite each other and magnets 76 having the S side facing the inductor are placed opposite each other. As shown in FIG. 6, this configuration generates a magnetic field 70 having a shape that follows the perimeter of the inductor core 50. The magnetic field 70 may not form a complete loop, compared to the magnetic field 58 in FIG. 4; however, the alignment of the grains/powder is similar. A finite element analysis (FEA) simulation of the magnet arrangement shown in FIG. 6 is shown in FIG. 7. The FEA simulation shows that the magnetic field 70 follows the perimeter of the core 50, with minor interruptions at points where the magnets are located (e.g., forming almost a complete loop). The magnetic field 70 may cause the unconsolidated grains to orient themselves in a plurality of directional alignments 78 that conform to, mimic, or follow the magnetic field 78. As shown, at least two or more of the alignments 78 may be distinct from one another.

Figure 8:
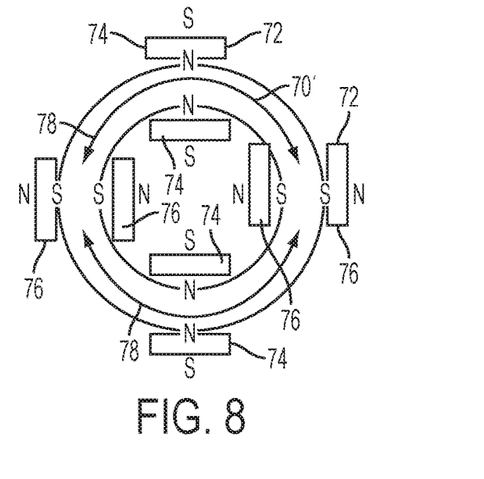
FIG. 8 is a schematic of a fixture for applying a magnetic field to a cylindrical inductor core using a plurality of permanent magnets, according to an embodiment.

As described previously, with respect to FIG. 5, the inductor or transformer core may have any suitable shape, such as a ring, toroid, or bar. As shown in FIG. 8, a plurality of magnets 72 may also be arranged to generate a desired magnetic field 70' in other core shapes. Similar to the arrangement described with respect to FIG. 6, a plurality of magnets 72 may be arranged inside and outside or the core 50'. The magnets 72 may be arranged such that on the inside and the outside, the magnets alternate between having the N and S sides/portions of the magnet face the inductor core 50'. The magnets 72 may be arranged such that magnets 74 having the N side facing the inductor are placed opposite each other and magnets 76 having the S side facing the inductor are placed opposite each other. As shown in FIG. 8, this configuration generates a magnetic field 70' having a shape that follows the perimeter of the inductor core 50'.

While the arrangement of magnets 72 in FIGS. 6 and 8 show four magnets inside and four magnets outside, with a pair of magnets on each side, such configurations are merely exemplary and are not intended to be limiting. The number and/or location of the magnets 72 may be adjusted to tailor the magnetic field to the desired shape/direction. For example, more magnets 72 may be used to provide a more uniform, complex, and/or sophisticated magnetic field. In the embodiment shown in FIG. 9, eight pairs of magnets 72 are arranged in and around the core 50'', with two pairs per side, to provide a magnetic field 70''. The field 70'' may have a similar shape to the magnetic field 70, generated by the arrangement of four pairs of magnets 72 shown in FIG. 6, however the increased number of magnets 72 may provide a more controlled and/or defined magnetic field.

Figure 9:
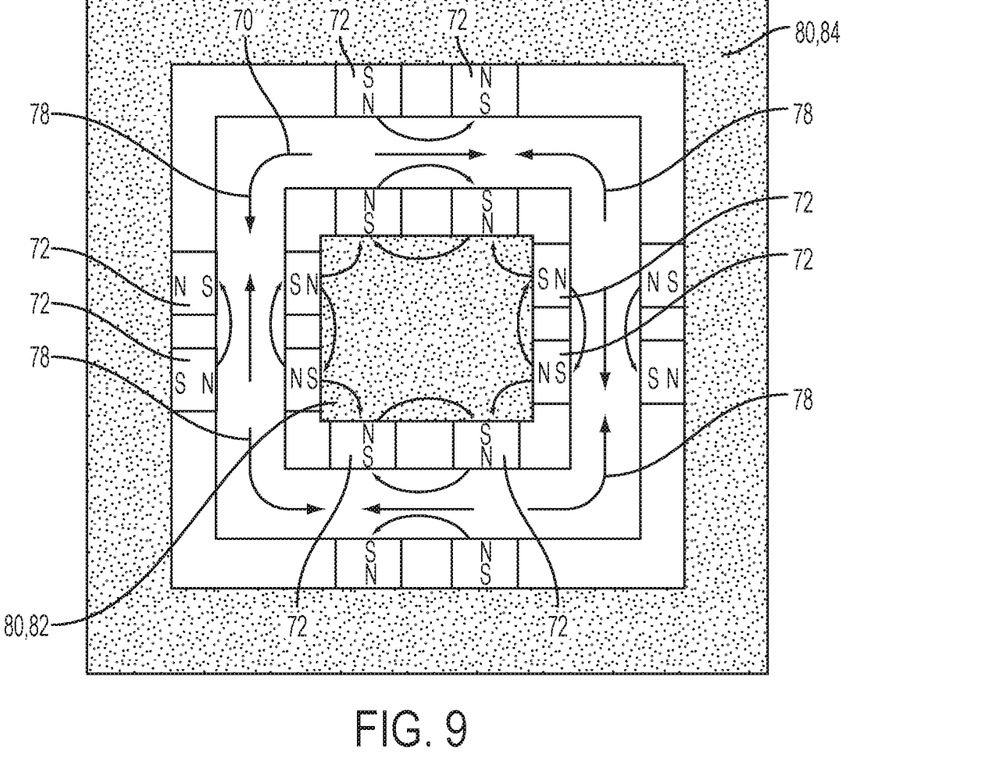
FIG. 9 is a schematic of a fixture for applying a magnetic field to a rectangular inductor core using a plurality of permanent magnets and iron cores, according to an embodiment.

In addition to adjusting the number and/or placement of the magnets 72, one or more iron cores 80 may be included in the alignment fixture, as shown in FIG. 9. For example, an iron core 82 may be placed in the inner cavity of the inductor core 50 and another iron core 84 may be placed on the outside of the core 50. The iron core(s) may guide the magnetic flux directions due to their much higher permeability compared to air. The core(s) therefore improve the efficiency of the fixture and enhance the magnetic alignment in magnetic core.

Figure 10:
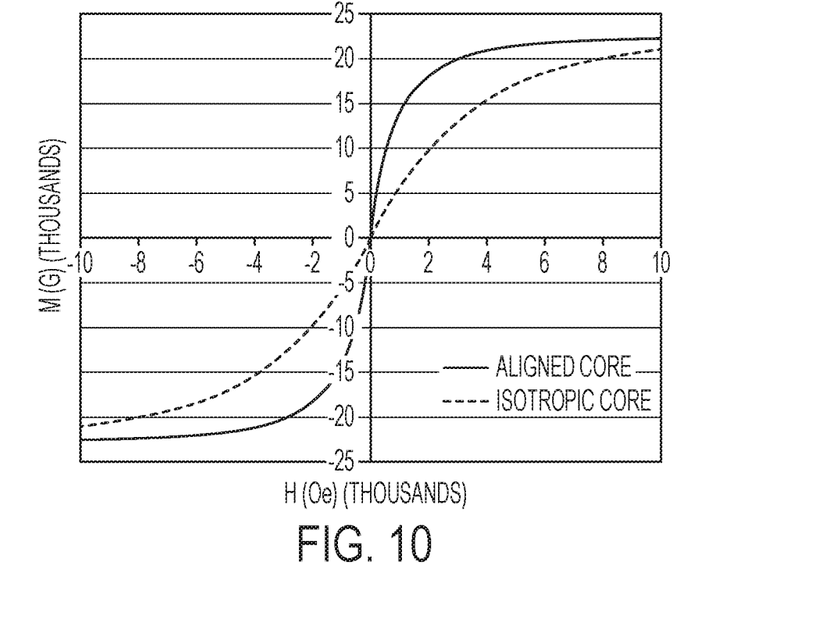
FIG. 10 is a plot of magnetization vs. field strength in an aligned magnetic core compared to an isotropic magnetic core.

With reference to FIG. 10, a graph of magnetization vs. field strength is shown in the direction parallel to the grain alignment in an aligned core and in an isotropic core without grain alignment. The results clearly show that the permeability in the aligned core is much greater than the permeability in the non-aligned core. The values in FIG. 10 are one example, and are not necessarily indicative of the precise values that may be achieved using the disclosed methods and fixtures.

Figure 11:
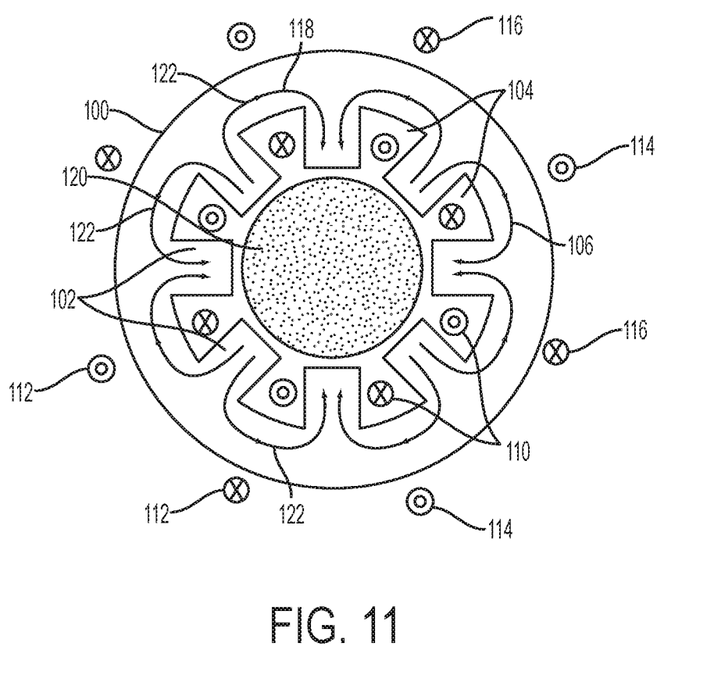
FIG. 11 is a schematic of a fixture for applying a magnetic field to a stator core using one or more electric circuits, according to an embodiment.

With reference to FIGS. 11-15, the disclosed methods and fixtures for generating a magnetic field in a magnetic core are also applicable to rotor and stator cores, as well as inductor, transformer, generator, or other magnet cores. A fixture for an external or outer stator core 100 is shown in FIG. 11, the core 100 including stator teeth 102 and stator slots or gaps 104. The magnetic flux in a stator core 100 during operation generally includes a plurality of flux paths forming arcs from one stator tooth 102 around a stator slot 104 to another stator tooth 102. Accordingly, to increase the permeability and flux density along the flux paths, a magnetic field 106 may be generated that mimics or approximates the flux paths and orients the grains along the same.

In one embodiment, shown in FIG. 11, the magnetic field 106 may be generated using a fixture including one or more electric circuits. The electric circuits (not shown) may include one or more current-carrying wires 108. One or more wires 110 may be placed inside the stator slots 104 and one or more wires 112 may be placed outside the stator core, opposite a wire 110 inside a stator slot 104. Accordingly, the fixture may include one or more pairs of wires, with one wire in each pair being inside the stator (e.g., in a slot 104) and one of each pair being outside the stator core 100. In one embodiment, one wire 114 in each pair may carry current in one direction while the other wire 116 in each pair carries current in the opposite direction. The pairs of wires may alternate their configuration such that adjacent slots 104 have wires with alternating current directions, as shown in FIG. 11. As a result of the alternating pairs of wires, a magnetic field 106 may be generated such that arcs 118 are formed from tooth 102 to tooth 102 around the slots 104. This magnetic field mimics or approximates the flux paths in the stator during operation. The magnetic field 106 may cause the unconsolidated grains to orient themselves in a plurality of directional alignments 122 that conform to, mimic, or follow the magnetic field 106 (e.g., arc shapes). As shown, at least two or more of the alignments 122 may be distinct from one another.

While FIG. 11 is shown with pairs of wires, one inside and one outside of the stator core, in some embodiments wires are only inside or only outside of the stator core 100. For example, a fixture may include only wires 110 inside the stator slots 104. These wires may alternate current direction, as described above. In addition, while FIG. 11 shows that every stator slot 104 includes a wire 110, in some embodiments not every slot 104 may have a wire located therein. Similar to the fixture for the inductor core 50 in FIG. 9, an iron core 120 may be included in the fixture for the stator core 100. A core 120 may be included at the center or inner cavity of the stator core 100, as shown in FIG. 11. However, a core 120 may also surround the stator core 100 in addition to, or instead of, being placed in the center. Similar to the iron core in FIG. 9, the iron core 120 may assist in guiding the magnetic flux to form the desired shape or pattern.

Figure 12:
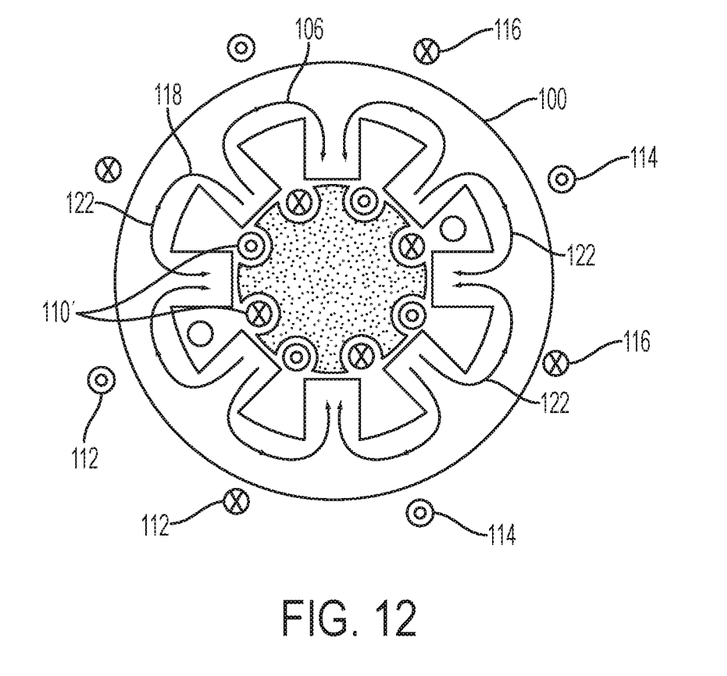
FIG. 12 is a schematic of another fixture for applying a magnetic field to a stator core using one or more electric circuits, according to an embodiment.

Another embodiment of a fixture for providing a magnetic field 106 alignment in a stator core 100 is shown in FIG. 12. In this embodiment, one or more wires 110' may be placed adjacent to the stator slots 104 or the stator teeth 102, rather than inside the stator slots 104. Placing the wires 110' adjacent to the slots 104 may be easier or more convenient in some fixtures. One or more wires 112 may be placed outside the stator core, opposite a wire 110', similar to described with reference to FIG. 11. Also similar to FIG. 11, one wire 114 in each pair may carry current in one direction while the other wire 116 in each pair carries current in the opposite direction. The pairs of wires may alternate their configuration such the wires 110' have alternating current directions, as shown in FIG. 12. As a result of the alternating pairs of wires, a magnetic field 106 may be generated such that arcs 118 are formed from tooth 102 to tooth 102 around the slots 104. Similar to the fixture of FIG. 11, in some embodiments there may be wires only inside or outside of the stator core 100 and/or not every stator tooth 102 or slot 104 may have a wire associated therewith.

Figure 13:
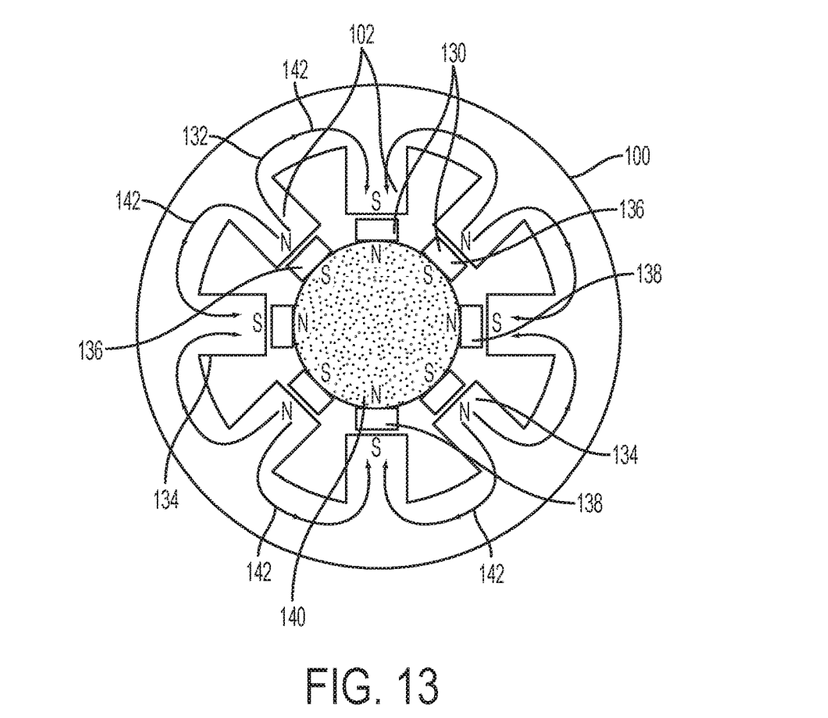
FIG. 13 is a schematic of a fixture for applying a magnetic field to a stator core using a plurality of permanent magnets, according to an embodiment.

As described above with respect to FIGS. 6, 8, and 9, the specific, customized magnetic field may also be provided using a plurality of magnets 130 (e.g., permanent magnets). The magnets 130 may be placed or arranged in a fixture in order to generate the magnetic field 132, which may have a similar shape or pattern as magnetic field 106 in FIGS. 11 and 12. In one embodiment, shown in FIG. 13, a plurality of magnets 130 may be positioned at the tips or ends 134 of each stator tooth 102. Each magnet 130 may have a N and S side or portion and the magnets 130 may be arranged such that they have alternating N and S portions facing the stator teeth 102, as shown in FIG. 13. Stated differently, magnets having a N side facing the stator tooth 102 may be designated as 136 and magnets having a S side facing the stator tooth may be designated as 138. Each magnet 136 may have a magnet 138 on either side of it, and vice versa. As described above, an iron core 140 may be placed in the center or inner cavity of the stator core 100 to assist in guiding the magnetic field 132. While not shown, the fixture may also include magnets located on the outside of the stator core, similar to the inductor embodiments described above.

Figure 14:
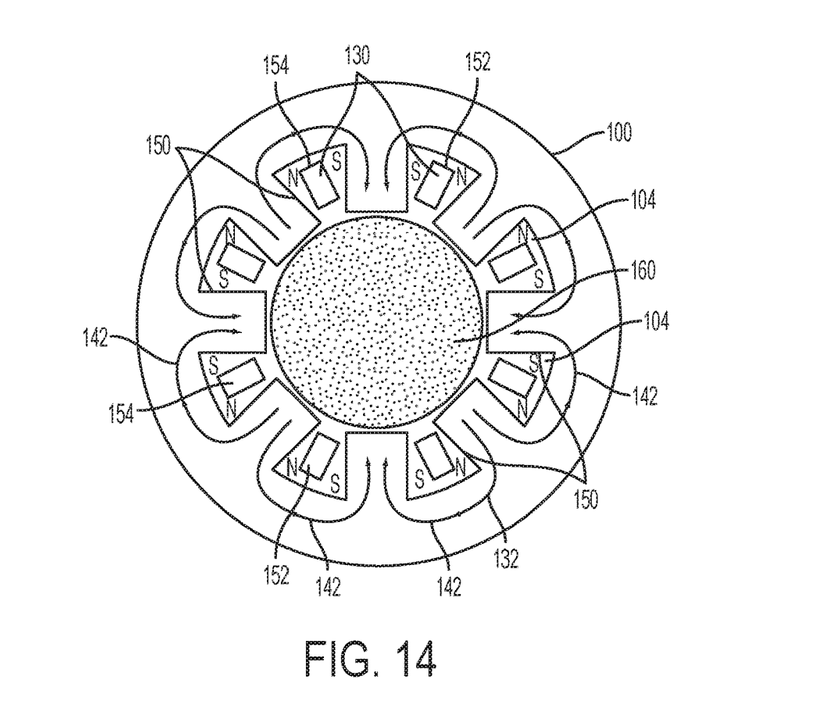
FIG. 14 is a schematic of another fixture for applying a magnetic field to a stator core using a plurality of permanent magnets, according to an embodiment.

In another embodiment, shown in FIG. 14, a fixture may include a plurality of magnets 130 placed inside the stator slots 104. For example, each stator slot 104 may have a magnet 130 located therein. The magnets 130 may be oriented such that the N and S sides each face a side 150 of the stator tooth 102. Some magnets 152 may have the N side facing in the clockwise direction and the S side facing in the counter-clockwise direction, while other magnets 154 may have the S side facing the clockwise direction and the N side facing in the counter-clockwise direction. In one embodiment, adjacent teeth 102 may have the opposite magnet configuration (e.g., 152 or 154) to form an alternating pattern of magnets 152 and 154, as shown in FIG. 14. Stated another way, each magnet 152 may have a magnet 154 on either side of it, and vice versa. This pattern or magnets may generate the magnetic field 132, as shown in FIG. 14. As described above, an iron core 160 may be placed in the center of the stator core 100 to assist in guiding the magnetic field 132. While not shown, the fixture may also include magnets located on the outside of the stator core, similar to the inductor embodiments described above. The magnetic field 132 may cause the unconsolidated grains to orient themselves in a plurality of directional alignments 142 that conform to, mimic, or follow the magnetic field 132 (e.g., arc shapes). As shown, at least two or more of the alignments 142 may be distinct from one another.

Figure 15:
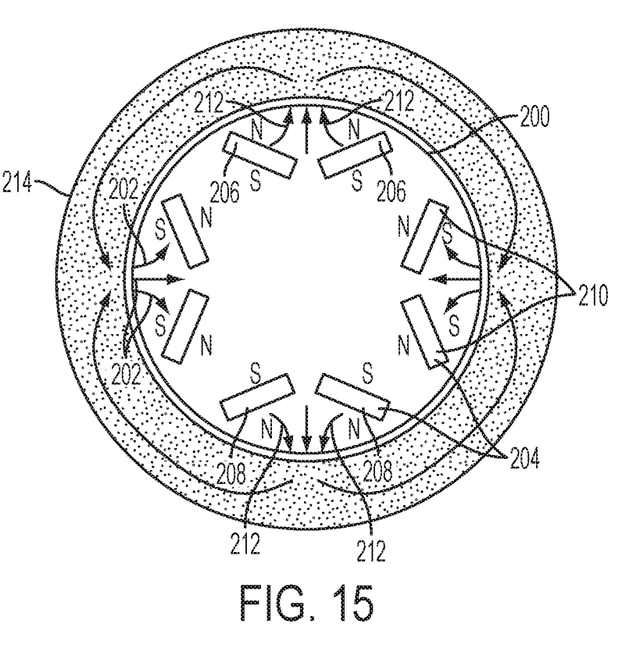
FIG. 15 is a schematic of a fixture for applying a magnetic field to a rotor core using a plurality of permanent magnets, according to an embodiment.

With reference to FIG. 15, a fixture for orienting the grains/powder of a rotor core 200 is shown. The alignment of the rotor core 200 may be performed using either an electric circuit or magnets, according to the methods described above. In the embodiment shown in FIG. 15, a magnetic field 202 may be formed using magnets 204 (e.g., permanent magnets). The magnets 204 may be grouped into pairs 206, which may generally form a V-shape or may form an angle (e.g., an obtuse angle). The magnets 204 may each have an N side and S side or portion. In one embodiment, each pair of magnets 206 may be configured such that both magnets 204 have the same side facing outward (either N or S). Pairs of magnets 206 having the N side facing outward may be designated as 208, while pairs 206 having the S side facing outward may be designated as 210. In one embodiment, the pairs may alternate such that each pair 208 has a pair 210 on each side, and vice versa, as shown in FIG. 15. While FIG. 15 shows four pairs of magnets 206, two pairs of 208 and two pairs of 210, the fixture may include any suitable number of pairs 206 of magnets 204. The magnetic field 202 may cause the unconsolidated grains to orient themselves in a plurality of directional alignments 212 that conform to, mimic, or follow the magnetic field 202. As shown, at least two or more of the alignments 212 may be distinct from one another.

In at least one embodiment, the magnets 204 used in the fixture may be the same permanent magnets that are incorporated into the rotor core 200 in its final form (e.g., in a permanent magnet motor). Accordingly, the permanent magnets that are used in the rotor are also used to orient the grains/powder during the rotor core manufacturing process (e.g., alignment and optionally compaction and/or sintering/curing). The permanent magnets may be embedded in the powder core during the manufacturing process and may remain in the core after the processing is finished to form the final rotor core. Similar to the fixtures described above, the fixture for the rotor orientation may include an iron core 214 that surrounds (partially or completely) the rotor core 200 in order to assist in guiding the magnetic field 202.

The non-limiting examples of fixtures described in FIG. 3-15 have been described in the context of sintered or bonded magnets. By using the fixtures to apply the disclosed magnetic fields while the magnetic powders are not yet fully consolidated, orientation of the grains may be made easier and more efficient/effective. However, the disclosed fixtures may also be used to orient consolidated or fully formed magnets, such as those formed of electric steels (e.g., electric steel laminations). In order to more effectively orient the magnetic grains, the magnetic core(s) may be heated, for example to a temperature of 400° C. to 900° C. The heating may be accomplished using any suitable method, and the heating equipment may be added to any of the disclosed fixtures. Accordingly, the disclosed benefits of magnetic grain orientation described above may be implemented in magnetic cores that are not formed from magnetic powders or that were already consolidated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fixture for aligning grains in a magnetic core, comprising:
    a plurality of inner magnets configured to be located in an interior of the magnetic core, the interior defined a cavity at and about a center of a core body of the magnetic core,
    the inner magnets configured to generate a magnetic field in the core body and align the grains of the magnetic core in a plurality of directional alignments; and
    a plurality of outer magnets located radially exterior to the core body, each inner magnet forming a magnet pair with an outer magnet.

2. The fixture of claim 1, wherein the inner magnets are configured to generate a magnetic field in the magnetic core that mimics a magnetic flux path of the magnetic core.

3. The fixture of claim 1, wherein each inner magnet has a north (N) side and a south (S) side.

4. The fixture of claim 1, wherein each magnet pair has either the N sides facing each other or the S sides facing each other and adjacent magnet pairs have opposite N and S side configurations.

5. The fixture of claim 1, wherein the magnetic core is a stator core having a plurality of stator teeth and a plurality of stator slots between the stator teeth, the teeth and slots located within the core body and radially outward of the cavity, the inner magnets being configured to generate a magnetic field in the stator core and align the grains in a plurality of arc-shaped alignments from one stator tooth to another stator tooth around a stator slot.

6. The fixture of claim 5, wherein the inner magnets are configured to be located at tips of the stator teeth or in the stator slots.

7. The fixture of claim 1, wherein the magnetic core is a rotor core and the inner magnets are rotor permanent magnets that remain in the rotor core after consolidation.

8. A fixture for aligning grains in a magnetic core comprising: one or more inner wires configured to be located in an interior of the core and to carry electric current in a first direction, the interior defined as a cavity at and about a center of a core body of the magnetic core; and
    one or more outer wires configured to be located radially exterior to the core body and to carry electric current in a second direction, opposite the first;
    the inner and outer wires configured to generate a magnetic field in the magnetic core to align grains of the magnetic core in a plurality of directional alignments.

9. The fixture of claim 8, wherein the inner and outer wires are configured to generate a magnetic field in the magnetic core and align the grains in a plurality of directional alignments that mimic a magnetic flux path of the magnetic core.

10. The fixture of claim 8, wherein there are a plurality of inner wires and a plurality of outer wires and each inner wire forms a wire pair with an outer wire.

* * * * *